United States Patent
Ina

(10) Patent No.: US 11,310,871 B2
(45) Date of Patent: Apr. 19, 2022

(54) DISTRIBUTION SYSTEM, DISTRIBUTION METHOD AND RECORDING MEDIUM FOR ACQUIRING IDENTIFICATION INFORMATION OF A GATEWAY

(71) Applicant: NEC Corporation, Tokyo (JP)

(72) Inventor: Keisuke Ina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/023,872

(22) Filed: Sep. 17, 2020

(65) Prior Publication Data

US 2021/0100068 A1  Apr. 1, 2021

(30) Foreign Application Priority Data

Sep. 27, 2019  (JP) .............................. JP2019-176542

(51) Int. Cl.
| | |
|---|---|
| *H04W 88/16* | (2009.01) |
| *H04W 76/11* | (2018.01) |
| *H04W 4/24* | (2018.01) |
| *H04W 80/02* | (2009.01) |
| *H04W 4/06* | (2009.01) |

(52) U.S. Cl.
CPC ............. *H04W 88/16* (2013.01); *H04W 4/06* (2013.01); *H04W 4/24* (2013.01); *H04W 76/11* (2018.02); *H04W 80/02* (2013.01)

(58) Field of Classification Search
CPC ....... H04W 88/16; H04W 76/11; H04W 4/24; H04W 80/02; H04W 4/06; H04W 48/00; H04L 67/2809; H04L 67/12; H04L 12/14; H04M 15/31
See application file for complete search history.

(56) References Cited

U.S. PATENT DOCUMENTS

| | | | | |
|---|---|---|---|---|
| 2007/0286369 | A1* | 12/2007 | Gutt ........................ | H04L 12/66 379/127.01 |
| 2018/0302941 | A1* | 10/2018 | Li .......................... | H04W 88/16 |
| 2019/0037378 | A1* | 1/2019 | Xia ......................... | H04W 4/70 |
| 2019/0069221 | A1* | 2/2019 | Virgile ................... | H04W 88/16 |
| 2020/0045546 | A1* | 2/2020 | Zhou ...................... | H04W 76/10 |
| 2020/0153697 | A1* | 5/2020 | Turner .................... | H04L 41/12 |

FOREIGN PATENT DOCUMENTS

| | | |
|---|---|---|
| JP | 2005-086735 A | 3/2005 |
| JP | 2005-099910 A | 4/2005 |
| JP | 2005-235112 A | 9/2005 |
| JP | 2011-164901 A | 8/2011 |
| WO | 2018/190219 A1 | 10/2018 |

OTHER PUBLICATIONS

Japanese Office Action for JP Application No. 2019-176542 dated Aug. 25, 2020 with English Translation.

* cited by examiner

*Primary Examiner* — Afshawn M Towfighi
(74) *Attorney, Agent, or Firm* — Sughrue Mion, PLLC

(57) ABSTRACT

A distribution system includes: a gateway to be a kitting target; and a distribution server that distributes, to the gateway, kitting data associated with gateway identification information of the gateway, the distribution system further including a mobile terminal that acquires the gateway identification information wirelessly transmitted from the gateway and transmits the acquired gateway identification information to the distribution server, wherein the distribution server associates the gateway identification information transmitted from the mobile terminal, with the kitting data.

8 Claims, 10 Drawing Sheets

Fig.9

| USER INFORMATION | KITTING DATA | TERMINAL IDENTIFICATION INFORMATION | GW IDENTIFICATION INFORMATION | NUMBER OF DISTRIBUTIONS OF KITTING DATA | BILLING INFORMATION |
|---|---|---|---|---|---|
| USER A | DATA-A | AAAA | AA:BB:CC:DD:EE:FF | 100000 | ¥1,000,000 |
| | | AAAA | AA:CC:DD:EE:FF:BB | | |
| | | CCCC | FF:DD:CC:BB:AA:EE | | |
| | | : | : | | |
| USER B | DATA-B | DDDD | 12:34:56:78:90:AA | 50000 | ¥500,000 |
| | | EEEE | AA:09:87:65:43:21 | | |
| | | : | : | | |

DISTRIBUTION SYSTEM, DISTRIBUTION METHOD AND RECORDING MEDIUM FOR ACQUIRING IDENTIFICATION INFORMATION OF A GATEWAY

This application is based upon and claims the benefit of priority from Japanese Patent Application No. 2019-176542, filed on Sep. 27, 2019, the disclosure of which is incorporated herein in its entirety by reference.

TECHNICAL FIELD

The present disclosure relates to a distribution system and the like that distribute kitting data.

BACKGROUND ART

Internet of Things (IoT) is a technique for connecting various things to the Internet. A new IoT system using characteristics of IoT has ended a verification phase and has begun developing toward business on a full scale. In the IoT system, an IoT gateway takes a roll in collecting information indicating a state of a thing and relaying the collected information to a cloud server being a service platform.

A plurality of IoT gateways are disposed in the IoT system, and the number of man-hours of a worker is increased according to the installation number of IoT gateways. Therefore, in installation work of an IoT gateway, automatic kitting via a network using a kitting server is performed. In order to perform kitting via a network for an IoT gateway, it is necessary to previously register, before installation work of the IoT gateway, identification information of the IoT gateway and kitting data in a kitting server in association with each other.

When a production number or a media access control (MAC) address of an IoT gateway is used as identification information of the IoT gateway, each IoT gateway is logged in and identification information is extracted by using a command line interface (CLI), and therefore the number of man-hours for acquiring identification information is increased.

PTL 1 (Japanese Unexamined Patent Application Publication No. 2011-164901) discloses a technique for reducing, when a common digital content is installed in a plurality of terminals and the content is used, time and effort for installation work of the content and digital content management after installation.

SUMMARY

An object of the present disclosure is to provide a distribution system and the like capable of easily acquiring identification information of a gateway to be a kitting target.

Solution to Problem

A distribution system according to one aspect of the present disclosure is a distribution system including: a gateway to be a kitting target; and a distribution server that distributes, to the gateway, kitting data associated with gateway identification information of the gateway, the distribution system further including
a mobile terminal that acquires the gateway identification information wirelessly transmitted from the gateway and transmits the acquired gateway identification information to the distribution server, wherein
the distribution server associates the gateway identification information transmitted from the mobile terminal, with the kitting data.

A distribution method according to one aspect of the present disclosure is a distribution method for a distribution system including a gateway to be a kitting target, and a distribution server that distributes, to the gateway, kitting data associated with gateway identification information of the gateway, wherein
a mobile terminal acquires the gateway identification information wirelessly transmitted from the gateway and transmits the acquired gateway identification information to the distribution server, and
the distribution server associates the gateway identification information transmitted from the mobile terminal, with the kitting data.

A distribution program according to one aspect of the present disclosure is a distribution program for a distribution system including a gateway to be a kitting target, and a distribution server that distributes, to the gateway, kitting data associated with gateway identification information of the gateway, the program
causing a mobile terminal to acquire the gateway identification information wirelessly transmitted from the gateway and transmit the acquired gateway identification information to the distribution server, and
causing the distribution server to associate the gateway identification information transmitted from the mobile terminal, with the kitting data.

BRIEF DESCRIPTION OF THE DRAWINGS

FIG. 9 is a data sheet indicating one example of kitting information.

EXAMPLE EMBODIMENT

Figure 1:
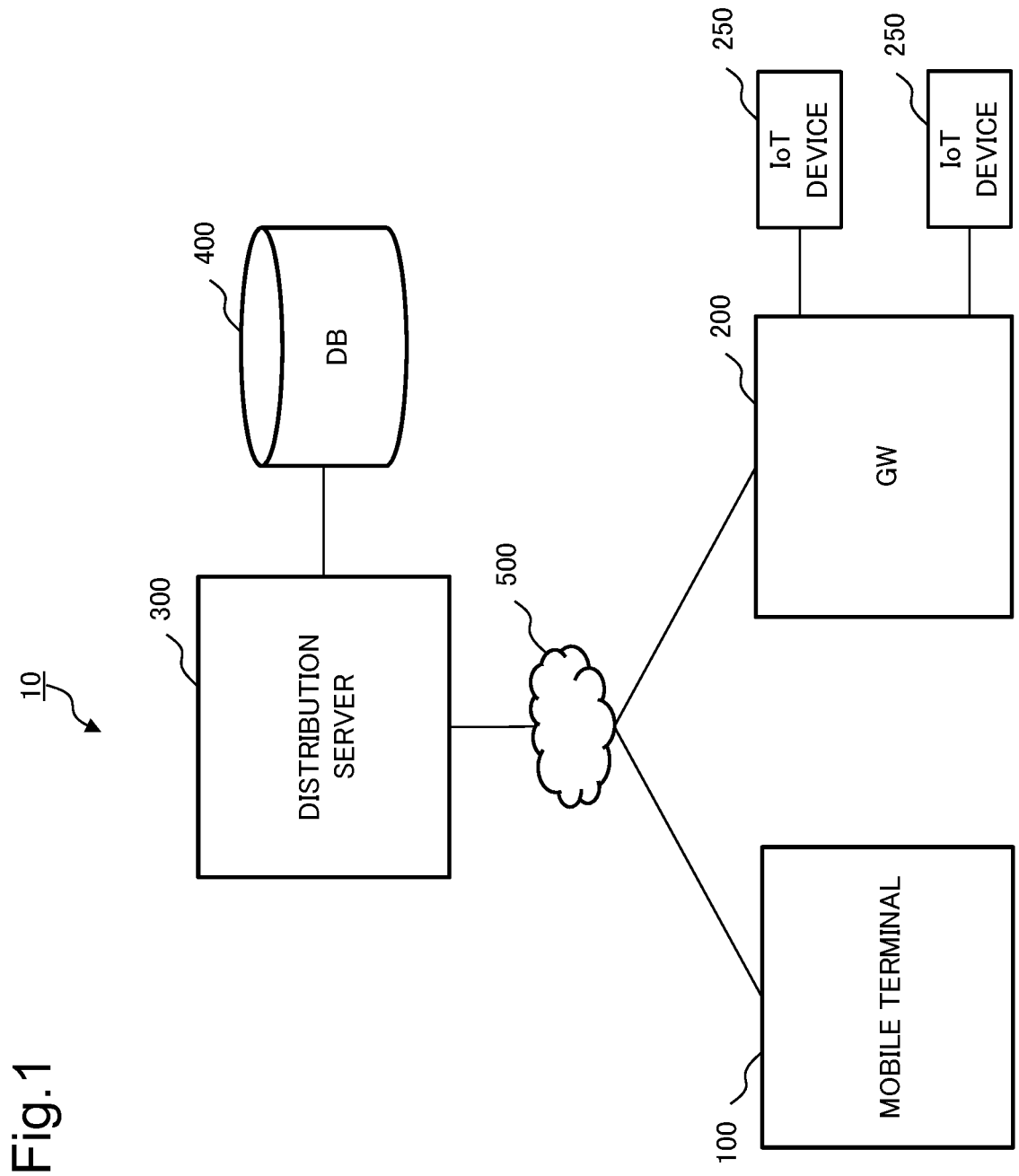
FIG. 1 is a block diagram illustrating a configuration of a distribution system 10 according to a first example embodiment.

A distribution system according to a first example embodiment of the present disclosure is described by using the accompanying drawings. FIG. 1 is a block diagram illustrating a configuration of a distribution system according to one aspect of the first example embodiment. A distribution system 10 illustrated in FIG. 1 includes a mobile terminal 100, a gateway (hereinafter, simply referred to as a GW) 200, and a distribution server 300. The mobile terminal 100, the GW 200, and the distribution server 300 are communicably connected via a network 500. The GW 200 is connected to a plurality of IoT devices 250. In FIG. 1, a database (DB) 400 is illustrated as being configured to be connected to the distribution server 300 but may be included in the distribution server 300. The DB 400 may be configured to be connected to the distribution server 300 via the network 500. According to the first example embodiment, a plurality of GWs 200 to be a kitting target may exist.

(Mobile Terminal)

The mobile terminal 100 acquires GW identification information from a GW 200 to be a kitting target by wireless communication and transmits the acquired GW identification information and terminal identification information of the mobile terminal 100 to the distribution server 300.

Figure 2:
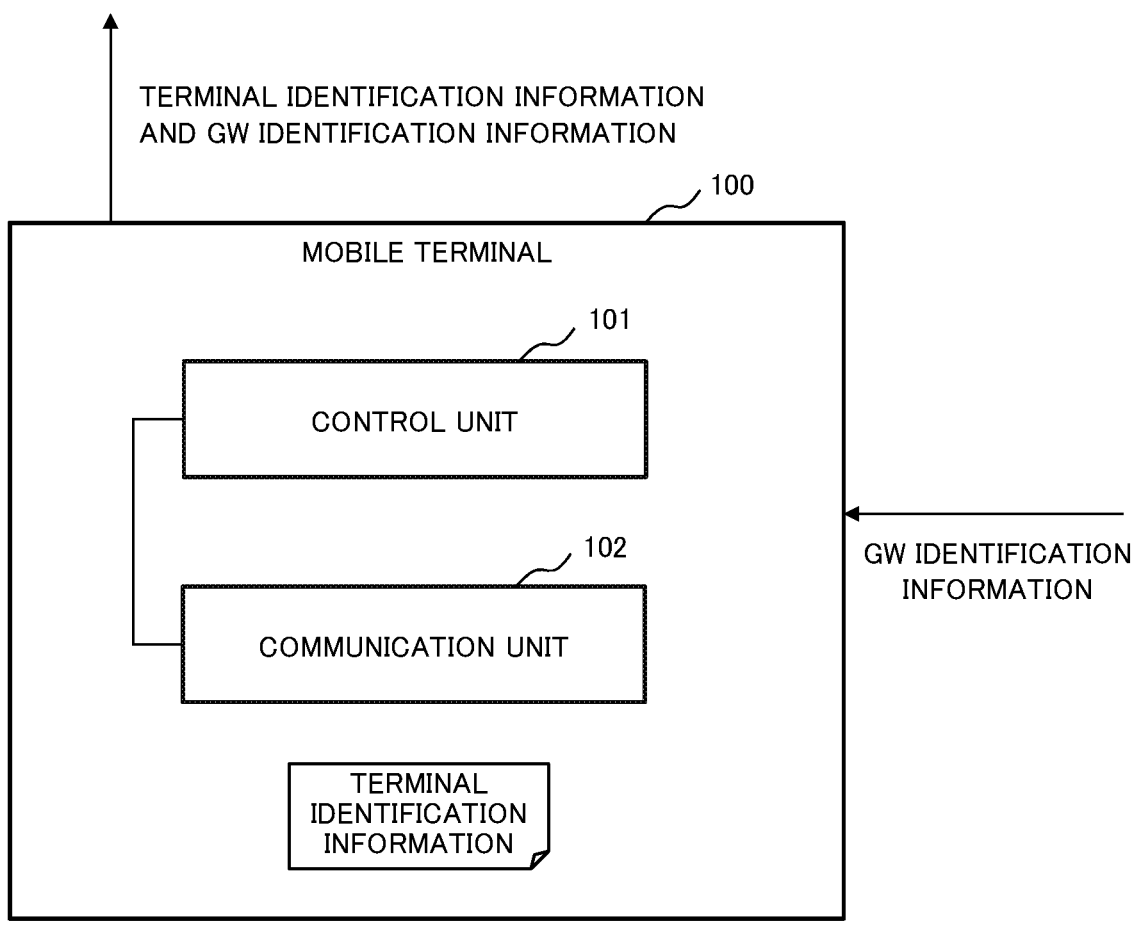
FIG. 2 is a block diagram illustrating a configuration of a mobile terminal 100 according to the first example embodiment.

FIG. 2 is a block diagram illustrating a configuration of the mobile terminal according to the first example embodiment. The mobile terminal 100 includes a control unit 101 and a communication unit 102. One example of the mobile terminal 100 is a smartphone.

The control unit 101 instructs the communication unit 102 to acquire GW identification information. The control unit 101 instructs the communication unit 102 to transmit the acquired GW identification information and terminal identification information of the mobile terminal 100 to the distribution server 300.

Figure 3:
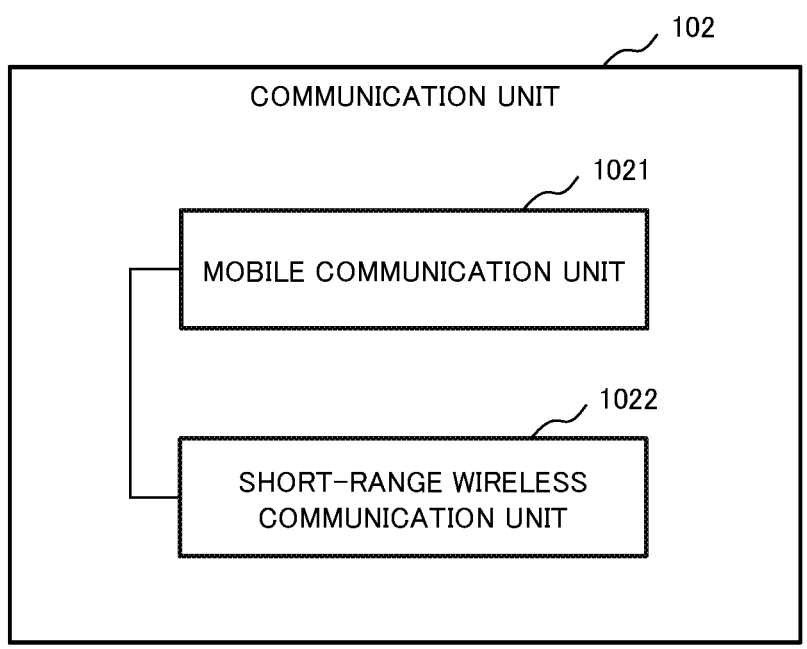
FIG. 3 is a block diagram illustrating a configuration of a communication unit 102 of the mobile terminal 100.

The communication unit 102 acquires GW identification information of the GW 200 by wireless communication. The communication unit 102 transmits the acquired GW identification information and terminal identification information to the distribution server 300. FIG. 3 is a block diagram illustrating a configuration of the communication unit 102. The communication unit 102 includes a mobile communication unit 1021 and a short-range wireless communication unit 1022. The mobile communication unit 1021 includes a communication function conforming to, for example, 4th Generation (4G) Communication Standard. The mobile communication unit 1021 is connected to the network 500 via a base station (not illustrated) of a mobile communication system. The short-range wireless communication unit 1022 includes a function of an observer that receives data transmitted by a broadcaster. The short-range wireless communication unit 1022 includes, for example, a Bluetooth Low Energy (®) communication device. It is assumed that the GW 200 includes a communication function conforming to the same wireless standard as the mobile terminal 100 in order to transmit GW identification information.

In the communication unit 102, the short-range wireless communication unit 1022 acquires GW identification information of the GW 200, and the mobile communication unit 1021 transmits the acquired GW identification information and terminal identification information to the distribution server 300. When the short-range wireless communication unit 1022 receives different pieces of GW identification information from a plurality of GWs 200, the control unit 101 associates each of pieces of the received GW identification information with terminal identification information. The communication unit 102 transmits the associated GW identification information and terminal identification information to the distribution server 300. Details of acquisition of GW identification information using short-range wireless communication are described later.

(Gateway)

Figure 4:
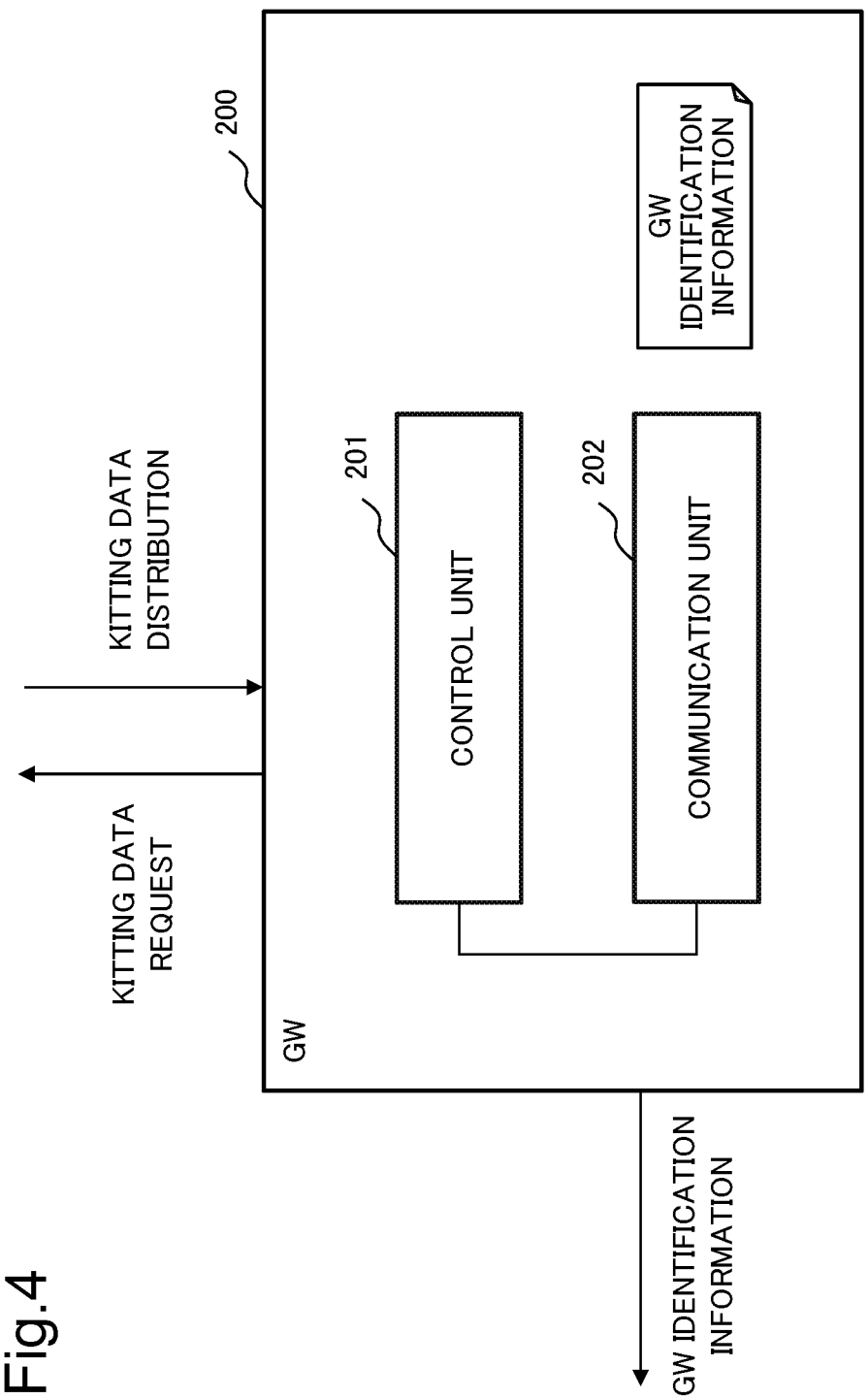
FIG. 4 is a block diagram illustrating a configuration of a GW 200 according to the first example embodiment.

The GW 200 is a gateway (also referred to as an IoT gateway) to be a kitting target. FIG. 4 is a block diagram illustrating a configuration of the GW 200 according to the first example embodiment. The GW 200 illustrated in FIG. 4 includes a control unit 201 and a communication unit 202. A function of each of the control unit 201 and the communication unit 202 of the GW 200 may be executed by a kitting agent program.

The control unit 201 instructs the communication unit 202 to transmit GW identification information. The control unit 201 instructs the communication unit 202 to transmit a kitting data request to the distribution server 300. When it is difficult to receive kitting data from the distribution server 300, the control unit 201 instructs the communication unit 202 to transmit a kitting data request at a certain time interval. When it is difficult to receive kitting data even when a kitting data request of a predetermined number of times is transmitted, the control unit 201 cancels a kitting data request and reports error information. A report of error information may be a change in color or lighting of a lamp light source included in the GW 200 or may be a vibration or a sound using a known device. In contrast, the control unit 201 executes kitting after receiving kitting data from the distribution server 300.

Figure 5:
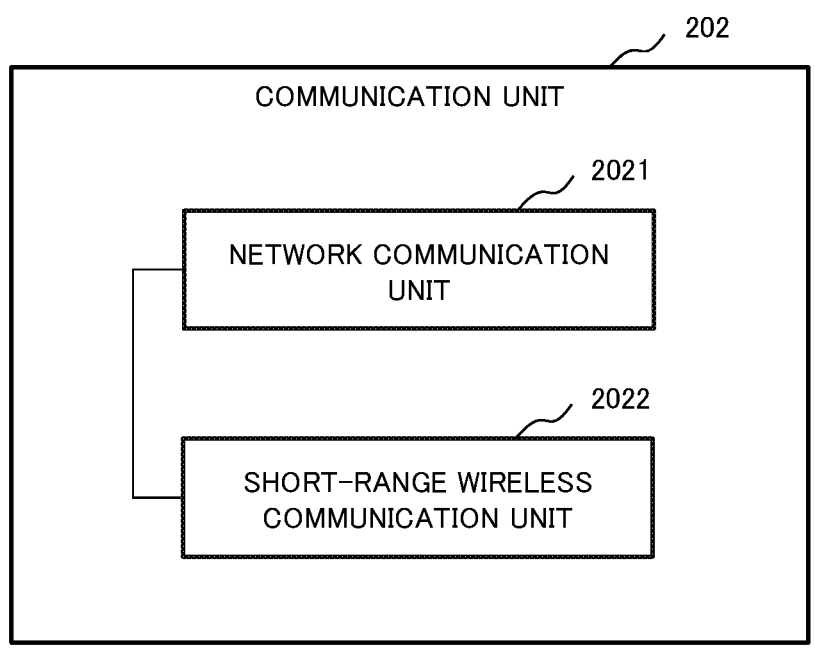
FIG. 5 is a block diagram illustrating a configuration of a communication unit 202 of the GW 200.

The communication unit 202 performs broadcast communication of GW identification information by using short-range wireless communication. The communication unit 202 transmits GW identification information and a kitting data request to the distribution server 300 and receives kitting data distributed from the distribution server 300. FIG. 5 is a block diagram illustrating a configuration of a communication unit of a GW. The communication unit 202 illustrated in FIG. 5 includes, for example, a network communication unit 2021 and a short-range wireless communication unit 2022.

The network communication unit 2021 includes a communication function conforming to a communication standard of a wired network or a wireless network. The network communication unit 2021 is communicably connected to the IoT device 250 illustrated in FIG. 1. A wired network is, for example, a wired local area network (LAN), and a wireless network is, for example, a mobile network or a wireless LAN. The short-range wireless communication unit 2022 includes a function of a broadcaster that broadcasts data. The short-range wireless communication unit 2022 is, for example, a Bluetooth Low Energy (hereinafter, referred to as BLE) communication device. In this case, GW identification information is a MAC address of a BLE communication device.

(Distribution Server)

The distribution server 300 generates kitting information for distributing kitting data to a GW 200 to be a kitting target and distributes, by using the generated kitting information, kitting data related to a GW 200 having transmitted a kitting data request. The distribution server 300 generates billing information according to the number of distributions of kitting data with respect to each user of a kitting service using the distribution server 300.

Figure 6:
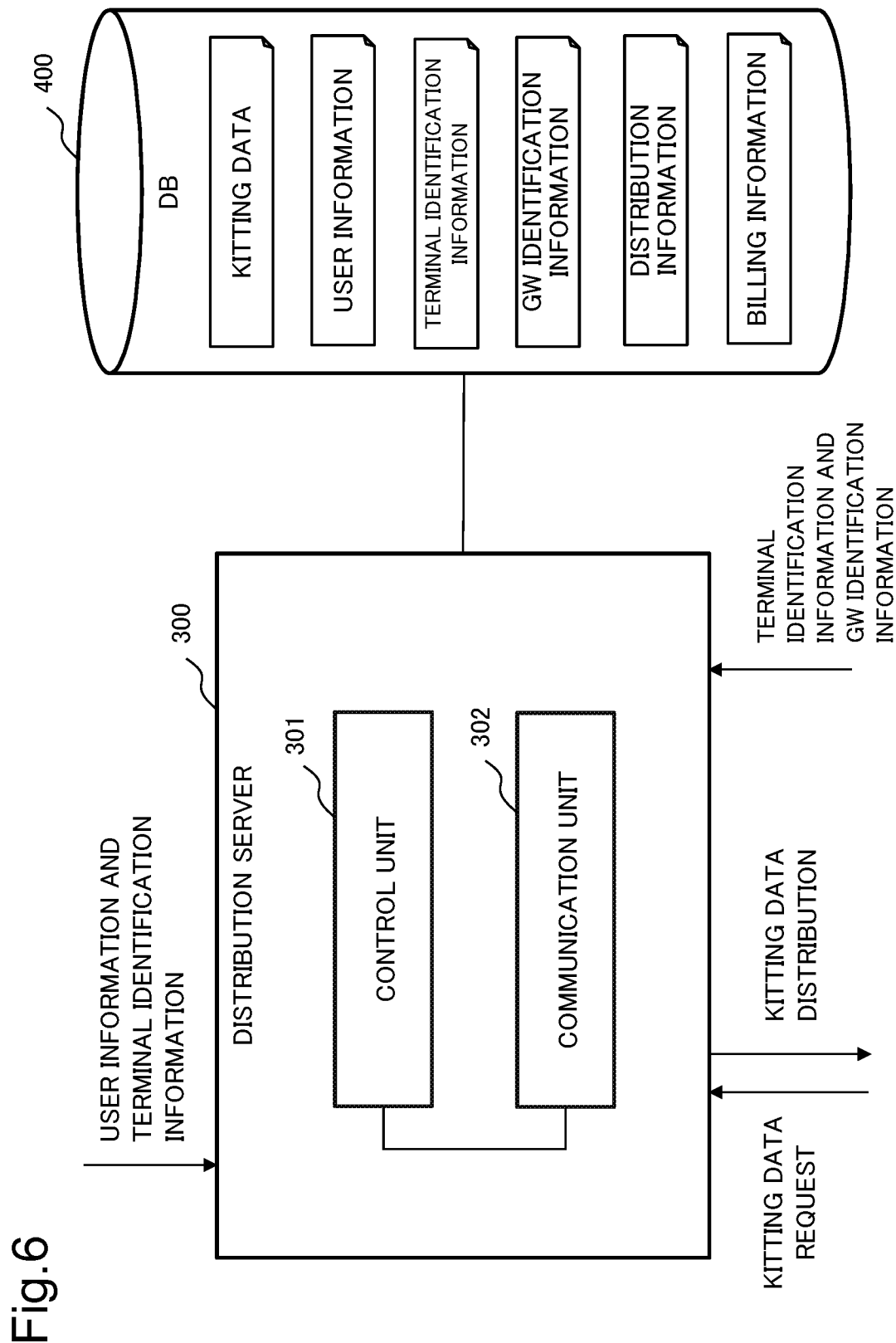
FIG. 6 is a block diagram illustrating a configuration of a distribution server 300 according to the first example embodiment.

The distribution server 300 according to the first example embodiment is described by using a drawing. FIG. 6 is a block diagram illustrating a configuration of the distribution server 300 according to the first example embodiment. The distribution server 300 illustrated in FIG. 6 includes a control unit 301 and a communication unit 302.

Before kitting processing for the GW 200, the communication unit 302 receives user information and kitting data of the GW 200 from a client terminal (not illustrated) of a user and further receives user information and terminal identification information of the mobile terminal 100. User information is an identifier of a user receiving a kitting service. Kitting data are data for executing initial setting of the GW 200 or installation of software. Terminal identification information is an identifier of the mobile terminal 100 used by a worker installing the GW 200. The control unit 301 associates acquired user information with kitting data and further associates the acquired user information with terminal identification information.

The communication unit 302 receives GW identification information and terminal identification information from the mobile terminal 100. GW identification information is an identifier of a GW 200 to be a kitting target. The control unit 301 associates GW identification information and terminal identification information. The control unit 301 generates kitting information of the GW 200 in which user information, kitting data, terminal identification information, and GW identification information are associated and registers the generated kitting information in the DB 400.

The communication unit 302 receives GW identification information and a kitting data request from the GW 200. The control unit 301 searches the DB 400 by using, as a key, GW identification information received from a GW 200 to be a kitting target and extracts kitting data related to the GW identification information. The control unit 301 instructs the communication unit 302 to transmit the related kitting data to the GW 200 as a request source.

The control unit 301 distributes kitting data to a GW 200 to be a kitting target, refers to kitting information of the DB 400, and updates, by counting-up, a value of the number of distributions of kitting data related to user information. When the number of distributions is updated, the control unit 301 updates, according to the number of distributions, billing information associated with user information. The distribution server 300 generates, based on the billing information, payment request data of a kitting service for each piece of user information.

A function of each of the control unit 301 and the communication unit 302 of the distribution server 300 may be executed by providing a distribution-server application programming interface (API).

Figure 7:
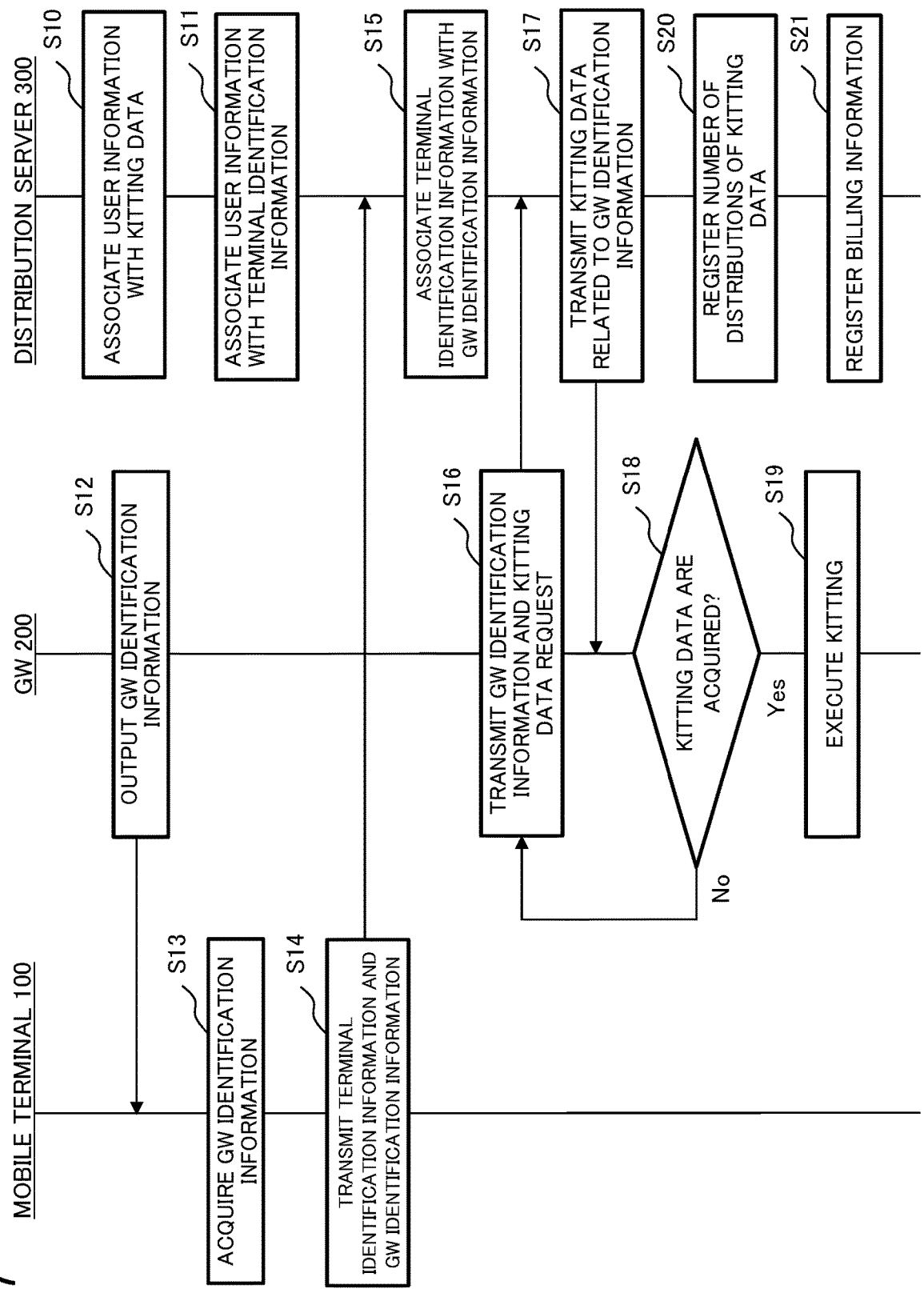
FIG. 7 is a sequence diagram illustrating an operation of the distribution system 10 according to the first example embodiment.

Next, an operation of the distribution system according to the first example embodiment is described by using a drawing. FIG. 7 is a sequence diagram illustrating an operation of the distribution system according to the first example embodiment.

First, generation processing of kitting information in the distribution system 10 is described. The distribution server 300 generates kitting information for distributing kitting data to the GW 200 and registers the generated kitting information in the DB 400. Kitting information includes at least user information, kitting data, terminal identification information, and GW identification information.

Specifically, the communication unit 302 of the distribution server 300 receives user information "a user A" and kitting data "DATA-A" of the GW 200 from a client terminal (not illustrated) of a user. The control unit 301 of the distribution server 300 associates the acquired user information with the acquired kitting data (step S10). The control unit 301 generates kitting information including the user information and the kitting data and registers the generated kitting information in the DB 400.

The distribution server 300 receives, from the client terminal of the user, the user information "user A" and terminal identification information "AAAA". The distribution server 300 associates the acquired user information with the acquired terminal identification information (step S11). The control unit 301 searches for kitting information related to the user information from the DB 400, adds the received terminal identification information to a terminal identification information field of a related record, updates kitting information of the GW 200, and registers the updated kitting information in the DB 400. A client terminal may be a terminal of a user using a kitting service based on the distribution server 300 or may be a terminal of a provider providing a kitting service.

In contrast, an on-site worker installing a GW 200 starts a GW 200 to be a kitting target. The GW 200 outputs GW identification information by broadcast transmission from the short-range wireless communication unit 2022 of the communication unit 202 (step S12).

Figure 8:
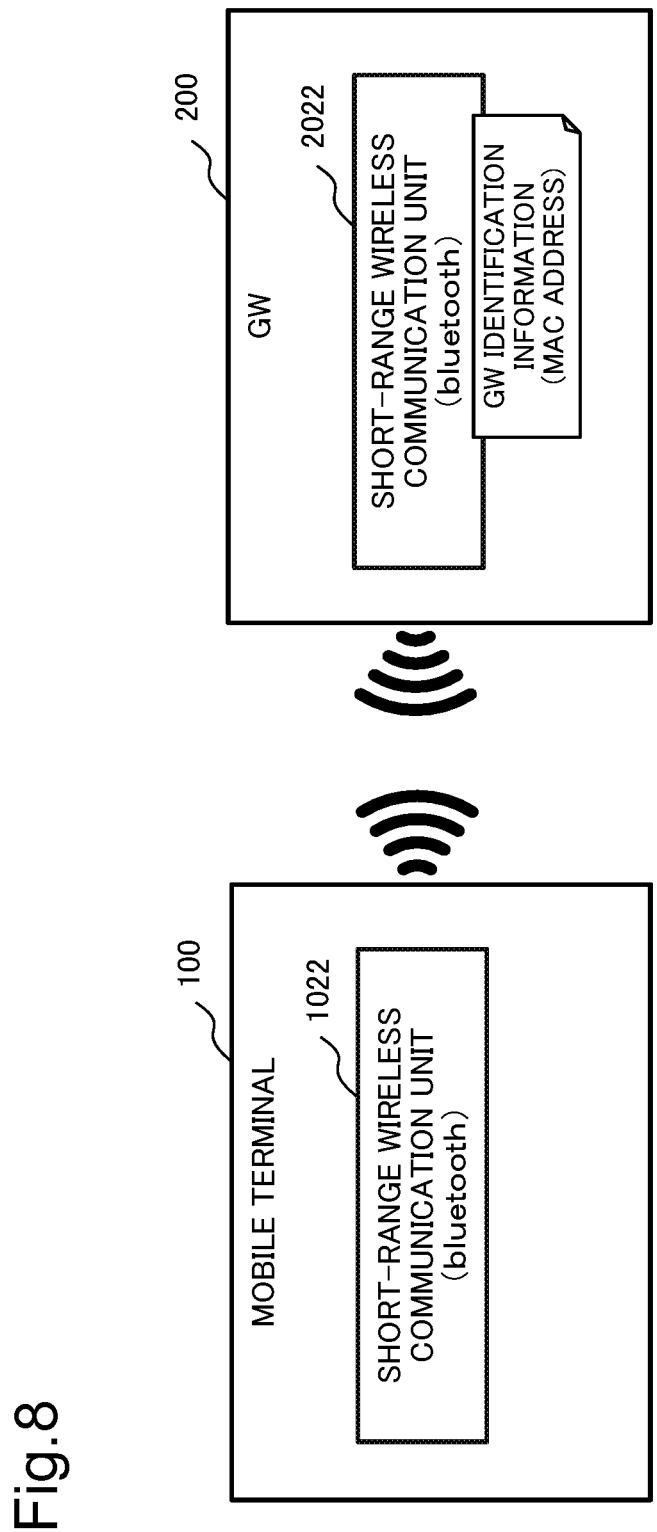
FIG. 8 is a diagram illustrating an example in which the mobile terminal 100 acquires GW identification information of the GW 200.

The mobile terminal 100 receives the GW identification information transmitted from the GW 200. FIG. 8 is a diagram illustrating one example in which the mobile terminal 100 acquires GW identification information of the GW 200. In FIG. 8, the short-range wireless communication unit 2022 of the GW 200 includes a BLE communication device and periodically broadcasts a MAC address "AA:BB:CC:DD:EE:FF" of the BLE communication device being GW identification information. The short-range wireless communication unit 1022 of the mobile terminal 100 includes a BLE communication device and acquires, via scanning, a MAC address of the BLE communication device of the GW 200.

The control unit 101 acquires terminal identification information "AAAA" stored in a storage unit (not illustrated) of the mobile terminal 100 (step S13). The control unit 101 transmits the acquired GW identification information and terminal identification information to the distribution server 300 via the communication unit 102 (step S14). A function of each of the control unit 101 and the communication unit 102 is executed, for example, by a kitting application mounted on a smartphone.

The communication unit 302 of the distribution server 300 receives, from the mobile terminal 100, GW identification information "AA:BB:CC:DD:EE:FF" and terminal identification information "AAAA". The control unit 301 associates the GW identification information with the terminal identification information acquired from the mobile terminal 100 (step S15). Next, the control unit 301 searches, from the DB 400, for kitting information related to the received terminal identification information, adds the received GW identification information to a GW identification information field of a related record, updates kitting information of the GW 200, and registers the updated kitting information in the DB 400.

FIG. 9 illustrates a data sheet indicating one example of kitting information. Kitting information illustrated in FIG. 9 includes user information, kitting data, terminal identification information, and GW identification information. Kitting information further includes the number of distributions of kitting data and billing information. A plurality of pieces of terminal identification information may be registered for user information or kitting data. As illustrated in FIG. 9, for example, "AAAA" and "CCCC" of terminal identification information may be associated with "DATA-A" of kitting data.

The mobile terminal 100 transmits terminal identification information and GW identification information acquired from the GW 200 to the distribution server 300 having generated kitting information in which terminal identification information of the mobile terminal 100, user information, and kitting data are associated, and the distribution server 300 updates the kitting information. Thereby, the distribution server 300 can associate kitting data with GW identification information of a GW 200 to be a kitting target.

Next, kitting data distribution processing and kitting processing in the distribution system 10 are described. First, the control unit 201 of the GW 200 acquires GW identification information stored in the GW 200. The control unit 201 transmits, via the communication unit 202, GW identification information and a kitting data request to the distribution server 300 (step S16).

Next, the control unit 301 of the distribution server 300 searches the DB 400 by using, as a key, the GW identification information received from the GW 200. When kitting data related to the GW identification information are not stored in the DB 400, the control unit 301 cancels distribution processing of kitting data.

When kitting data related to the GW identification information are stored, the control unit 301 acquires the related kitting data and transmits the acquired kitting data to a GW 200 of a request source (step S17).

When kitting data are not acquired from the distribution server 300 (No in step S18), the control unit 201 of the GW 200 instructs the communication unit 202 to transmit GW identification information and a kitting data request at a certain time interval. When it is difficult to receive kitting data even when a kitting data request of a predetermined number of times is transmitted, the control unit 201 cancels a kitting data request.

In contrast, when kitting data are acquired from the distribution server 300 (Yes in step S18), the control unit 201 executes kitting (step S19).

Next, billing processing in the distribution system 10 is described. The control unit 301 of the distribution server 300 distributes kitting data to the GW 200 and searches for user information of kitting information of the DB 400 by using, as a key, GW identification information of a request source. The control unit 301 increments a value of a field of the number of distributions of kitting data associated with a record of the related user information and again registers the incremented value in the same field (step S20).

The control unit 301 updates a value of a billing information field associated with user information, according to an increment of a value of the number of distributions. It is assumed that a calculation method of billing information multiplies the number of distributions of kitting data with a constant as a unit price.

(Advantageous Effects of the First Example Embodiment)

According to the distribution system 10 of the first example embodiment, GW identification information of a GW 200 to be a kitting target can be easily acquired. The reason is that the mobile terminal 100 scans and receives GW identification information wirelessly transmitted by the GW 200. Pieces of GW identification information each broadcast from each of a plurality of GWs 200 can be acquired at one time, and therefore when a plurality of GWs 200 are installed, the number of man-hours for acquiring pieces of GW identification information can be reduced. GW identification information is acquired by wireless communication, and therefore it is unnecessary to display identification information on an outside of a device wiredly connected.

According to the distribution system 10 of the first example embodiment, when kitting data are distributed to the GW 200 via a network, it is unnecessary to register, in the distribution server 300, GW identification information of the GW 200 before installation work of the GW 200. The reason is that during installation work of the GW 200, the mobile terminal 100 acquires GW identification information and transmits the acquired GW identification information to the distribution server 300 and thereby the distribution server 300 generates kitting information associating the GW identification information with kitting data.

While a configuration according to the first example embodiment has been described, the present example embodiment is not limited to the example.

Among pieces of kitting information, user information, kitting data, and terminal identification information may be registered by being associated with each other in the DB 400 by previously using a user interface (UI) of the distribution server 300 before executing kitting of the GW 200.

According to the first example embodiment, a low-power wide-area network (LPWAN) is usable as the network communication unit 2021 of the GW 200.

According to the first example embodiment, a MAC address of a Bluetooth device of the GW 200 was GW identification information but is not limited to GW identification information. Identification information defined in an original way is employable when being an identifier capable of uniquely identifying the GW 200. A specific number allocated to the GW 200 or a MAC address of a communication device other than a Bluetooth device mounted on the communication unit 202 may be GW identification information. One example of a specific number is a production number. When GW identification information is transmitted, GW identification information, defined in an original way, stored in the GW 200 is stored in an advertising packet of a Bluetooth device and the GW identification information stored in the advertising packet is extracted by the mobile terminal 100 being a reception side, and thereby a similar flow can be achieved.

As an example of the short-range wireless communication unit 1022, description has been made by using, but not limited to, a Bluetooth device. Wireless communication including a broadcast function is employable and, for example, ZigBee (®) is usable. When ZigBee is used, an individual ID of 8 bytes equivalent to a MAC address is transmitted as GW identification information. A wireless LAN including a broadcast function is employable.

(Hardware Configuration)

Figure 10:
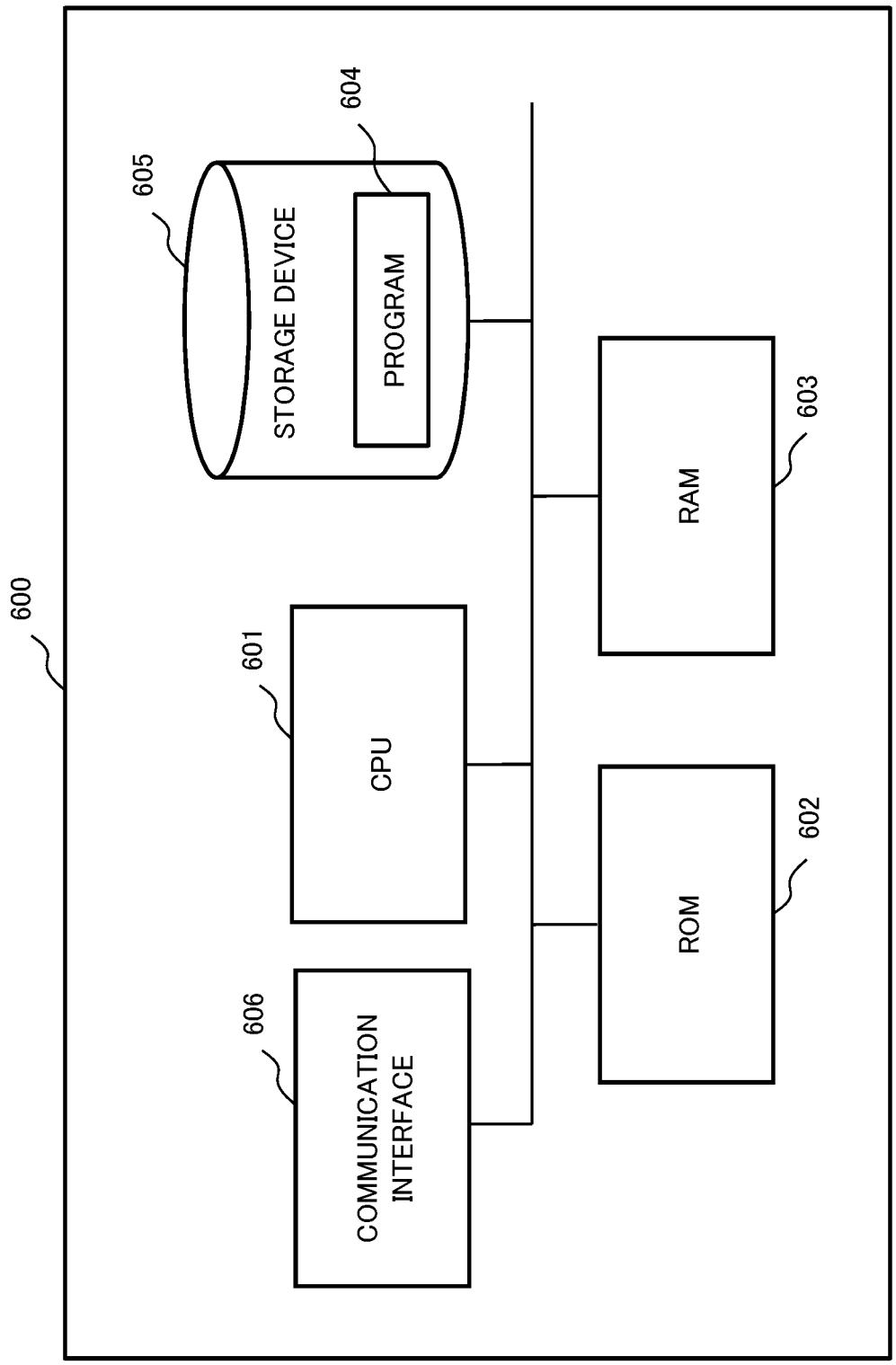
FIG. 10 is a diagram illustrating a hardware configuration based on a computer.

In at least some of components of the mobile terminal 100, the GW 200, and the distribution server 300 according to the first example embodiment, a program (software) is executed in a central processing unit (CPU) 601 of a computer 600 illustrated in FIG. 10. These components may be achieved by reading, by using the CPU 601, a program 604 from a read only memory (ROM) 602 or a storage device 605 and executing the read program 604 by using the CPU 601 and a random access memory (RAM) 603. The computer 600 is communicably connected to an external network via a communication interface 606.

A computer-readable storage medium includes, other than the storage device 605, for example, a removable magnetic disk medium, an optical disc medium, and a memory card which are not illustrated. The control unit 101 in FIG. 2, the control unit 201 in FIG. 4, and the control unit 301 in FIG. 6 may be dedicated hardware based on an integrated circuit.

The present disclosure is not limited to the above-described example embodiment and can be subjected to various modifications, and example embodiments made by appropriately combining a configuration, an operation, and processing disclosed in the example embodiment and a modified example thereof are included in the technical scope of the present disclosure.

A part or all of the above-described example embodiments may also be described as the following Supplementary Notes, but are not limited thereto.

[Supplementary Note]
[Supplementary Note 1]
A distribution system comprising:
a gateway to be a kitting target; and
a distribution server that distributes, to the gateway, kitting data associated with gateway identification information of the gateway, the distribution system further comprising
a mobile terminal that acquires the gateway identification information wirelessly transmitted from the gateway and transmits the acquired gateway identification information to the distribution server, wherein
the distribution server associates the gateway identification information transmitted from the mobile terminal, with the kitting data.

[Supplementary Note 2]
The distribution system according to Supplementary Note 1, wherein
the gateway transmits the gateway identification information by broadcasting, and
the mobile terminal receives the broadcast gateway identification information.

[Supplementary Note 3]
The distribution system according to Supplementary Note 1 or 2, wherein
the gateway identification information is a MAC address of communication unit included in the gateway or a specific number allocated to the gateway.

[Supplementary Note 4]
The distribution system according to any one of Supplementary Notes 1 to 3, wherein
the gateway transmits the gateway identification information stored in the gateway and a kitting data request to the distribution server.

[Supplementary Note 5]
The distribution system according to any one of Supplementary Notes 1 to 4, wherein
the distribution server calculates, based on a number of distributions of the kitting data to the gateway, billing information for kitting of the gateway.

[Supplementary Note 6]
A mobile terminal that is used for a distribution system including a gateway to be a kitting target and a distribution server that distributes, to the gateway, kitting data associated with gateway identification information of the gateway, the mobile terminal comprising
communication unit for acquiring the gateway identification information wirelessly transmitted from the gateway and transmitting the acquired gateway identification information to the distribution server, wherein
the distribution server associates the gateway identification information transmitted from the mobile terminal, with the kitting data.

[Supplementary Note 7]
A gateway of a distribution system including a gateway to be a kitting target and a distribution server that distributes, to the gateway, kitting data associated with gateway identification information of the gateway, the gateway comprising
communication unit that wirelessly transmits the gateway identification information, wherein
the distribution system includes a mobile terminal that acquires the gateway identification information from the gateway and transmits the acquired gateway identification information to the distribution server, and
the distribution server associates the gateway identification information transmitted from the mobile terminal, with the kitting data.

[Supplementary Note 8]
A distribution server of a distribution system including a gateway to be a kitting target and a distribution server that distributes, to the gateway, kitting data associated with gateway identification information of the gateway, wherein
the distribution system includes a mobile terminal that acquires the gateway identification information wirelessly transmitted from the gateway and transmits the acquired gateway identification information to the distribution server and
a control unit that associates the gateway identification information transmitted from the mobile terminal, with the kitting data.

[Supplementary Note 9]
A distribution method for a distribution system including a gateway to be a kitting target and a distribution server that distributes, to the gateway, kitting data associated with gateway identification information of the gateway, wherein
a mobile terminal acquires the gateway identification information wirelessly transmitted from the gateway and transmits the acquired gateway identification information to the distribution server, and
the distribution server associates the gateway identification information transmitted from the mobile terminal, with the kitting data.

[Supplementary Note 10]
A distribution program for a distribution system including a gateway to be a kitting target and a distribution server that distributes, to the gateway, kitting data associated with gateway identification information of the gateway, the program
causing a mobile terminal to acquire the gateway identification information wirelessly transmitted from the gateway and transmit the acquired gateway identification information to the distribution server, and
causing the distribution server to associate the gateway identification information transmitted from the mobile terminal, with the kitting data.

REFERENCE SIGNS LIST

100 Mobile terminal
101 Control unit
102 Communication unit
200 GW
201 Control unit
202 Communication unit
300 Distribution server
301 Control unit
302 Communication unit
400 DB

The invention claimed is:
1. A distribution system comprising:
a gateway; and
a distribution server that receives terminal identification information of a mobile terminal and gateway identification information of the gateway from the mobile terminal, associates the gateway identification information with kitting data associated with the terminal identification information, wherein the kitting data is data for executing initial setting or installation of software of the gateway and the distribution server distributes, to the gateway, the kitting data associated with gateway identification information of the gateway, wherein the mobile terminal acquires the gateway identification information wirelessly transmitted from the gateway and transmits the acquired gateway identification information associated with the terminal identification information to the distribution server.

2. The distribution system according to claim 1, wherein the gateway transmits the gateway identification information by broadcasting, and
the mobile terminal receives the broadcasted gateway identification information.

3. The distribution system according to claim 1, wherein the gateway identification information is a MAC address of a communication unit included in the gateway or a specific number allocated to the gateway.

4. The distribution system according to claim 1, wherein the gateway transmits the gateway identification information stored in the gateway and a kitting data request to the distribution server.

5. The distribution system according to claim 1, wherein the distribution server calculates, based on a number of distributions of the kitting data to the gateway, billing information for kitting of the gateway.

6. The distribution system according to claim 1, wherein the distribution server acquires user information and the terminal identification information, acquires the user information and the kitting data and associates the terminal identification information with the kitting data based on the user information.

7. A distribution method for a distribution system including a gateway and a distribution server,
the distribution method comprising:
by the distribution server,
receiving terminal identification information of a mobile terminal and gateway identification information of the gateway from the mobile terminal,
associating the gateway identification information with kitting data associated with the terminal identification information, wherein the kitting data is data for executing initial setting or installation of software of the gateway, and
distributing, to the gateway, the kitting data associated with the gateway identification information of the gateway, wherein
the mobile terminal acquires the gateway identification information wirelessly transmitted from the gateway and transmits the acquired gateway identification information associated with the terminal identification information to the distribution server.

8. A non-transitory computer-readable recording medium storing a distribution program for a distribution system including a gateway and a distribution server,
the program causing the distribution server to:
receive terminal identification information of a mobile terminal and gateway identification information of the gateway from the mobile terminal,
associate the gateway identification information with kitting data associated with the terminal identification information, wherein the kitting data is data for executing initial setting of the gateway or installation of software, and
distribute, to the gateway, the kitting data associated with the gateway identification information of the gateway, wherein
the mobile terminal acquires the gateway identification information wirelessly transmitted from the gateway and transmits the acquired gateway identification information associated with the terminal identification information to the distribution server.

\* \* \* \* \*